United States Patent [19]

Tsukamoto et al.

[11] Patent Number: 4,816,547

[45] Date of Patent: Mar. 28, 1989

[54] PROCESS FOR PRODUCING CARBON DICHALCOGENIDE HOMOPOLYMER AND HOMOPOLYMER PRODUCED THEREBY

[75] Inventors: Jun Tsukamoto, Otsu; Akio Takahashi, Kusatsu; Kiichiro Matsumura, Nara, all of Japan

[73] Assignee: Director General of the Agency of Industrial Science and Technology, Tokyo, Japan

[21] Appl. No.: 157,061

[22] Filed: Feb. 2, 1988

Related U.S. Application Data

[63] Continuation of Ser. No. 847,214, Apr. 2, 1986, abandoned.

[30] Foreign Application Priority Data

Apr. 8, 1985 [JP] Japan .................................. 60-72538

[51] Int. Cl.$^4$ ............................................. C08G 75/02
[52] U.S. Cl. .................................... 528/387; 423/439; 423/443; 423/509; 528/373
[58] Field of Search ................ 528/387, 373; 423/439, 423/443, 509

[56] References Cited

U.S. PATENT DOCUMENTS

3,386,970 6/1968 Pitt ..................................... 528/387
3,390,140 6/1968 Pitt ..................................... 528/387

FOREIGN PATENT DOCUMENTS

1231031 10/1986 Japan .................................. 528/387

*Primary Examiner*—Harold D. Anderson
*Attorney, Agent, or Firm*—Stevens, Davis, Miller & Mosher

[57] ABSTRACT

The present invention provides a process for producing carbon dichalcogenide polymers having a conductivity of about $10^{-8}$ S/cm without doping treatment which is increased to $10^{-4}$ to $10^{-2}$ S/cm by doping, by polymerizing carbon dichalcogenide monomers (carbon disulfide, carbon diselenide, etc.) in the form of a solution thereof under a low pressure in the presence of an anionic catalyst.

13 Claims, No Drawings

PROCESS FOR PRODUCING CARBON DICHALCOGENIDE HOMOPOLYMER AND HOMOPOLYMER PRODUCED THEREBY

This application is a continuation of application Ser. No. 847,214, filed Apr. 2, 1986, now abandoned.

BACKGROUND OF THE INVENTION

1. Field of the Invention

The present invention relates to a process for producing new conductive polymers, more particularly, carbon dichalcogenide polymers.

2. Description of the Prior Art

Conductive high molecular materials comprising a polymer skeleton having conjugated carbon-to-carbon double bonds have been synthesized heretofore. Examples of them include polyacetylene, polypyrrole, polyphenylene and polyphenylenevinylene. Further, polymers having chalcogenide atoms in the skeleton and apparently no conjugated double bonds but having semiconductivity or conductivity as proved by doping have been known. They include, for example, polyphenylene sulfide, polyphenylene selenide, polyphenylene telluride and polyvinylene sulfide. Among them, polymers prepared from carbon disulfide, carbon diselenide or carbon ditelluride may be assumed to have possible use as the conductive high molecular materials, though they do not have conjugated double bonds.

Only few investigations were made on the polymerization of carbon disulfide and its polymer was synthesized by only Bridgman [Proc. Am. Acad. Arts. Sci., 74, 399 (1941)]. According to his process, carbon disulfide is polymerized at 185° C. under about 55 kbar in a pressure vessel for several hours to form a black, powdery polymer. However, the polymer cannot be prepared easily, since very severe conditions are required, namely, carbon disulfide having a boiling point of 46° C. must be kept at a high temperature under a pressure of as high as above 50 kbar. In addition, the polymer thus obtained is an insulater having a conductivity of as low as below $10^{-14}$ S/cm. Even when the polymer is doped, its conductivity is improved only slightly. For example, when it is doped with 5 molar % of iodine, the conductivity is increased to, at the highest, only $10^{-10}$ S/cm.

On the other hand, it has been known that carbon diselenide can be polymerized at a temperature of 100° to 200° C. under about 5,000 atm [Y. Okamoto and P.S. Wojciechowski, J. Chem. Soc., Chem. Commun. 386 (1982) and H. Kobayashi et al., Chem. Lett., 1407 (1983)].

However, this process cannot be considered to be an easy process for producing the polymers, since the pressure of as high as 5000 atm is required for the synthesis and the physical properties of the obtained polymers are poor.

SUMMARY OF THE INVENTION

The above-mentioned conventional process for producing carbon dichalcogenide polymers under high pressure is not easy, since quite severe conditions are required. Further, the obtained polymer has a problem that its conductivity cannot be improved sufficiently by doping. An object of the present invention is to polymerize a carbon dichalcogenide under atmospheric pressure to obtain a polymer having a high conductivity.

After intensive investigations on the synthesis of carbon dichalcogenide polymers made for the purpose of attaining the above-mentioned object, the inventors have developed a process which can be carried out typically at room temperature under 1 atm. It has been found that the polymer obtained by this process has a conductivity of around $10^{-8}$ S/cm without doping treatment and it can be increased to $10^{-4}$ to $10^{-2}$ S/cm by said treatment. The present invention relates to a process for producing such carbon dichalcogenide polymers near ambient temperature under a pressure as low as ambient pressure (e.g. 1 atm or below).

According to the present invention, carbon dichalcogenide polymers having a high conductivity can be obtained by polymerizing a carbon dichalcogenide monomer in the form of its solution in the presence of an anionic polymerization catalyst under a low pressure.

According to the present invention, carbon dichalcogenide polymers having a higher conductivity can be obtained by doping the obtained polymer.

DETAILED DESCRIPTION OF THE INVENTION

The present invention relates to a process for polymerizing carbon dichalcogenides in the presence of an anionic polymerization catalyst in a suitable solvent. The term "suitable solvent" herein means an inert organic solvent in which the associated monomers are soluble. The solvents include polar solvents such as dimethyl sulfoxide, dimethylformamide, tetrahydrofuran and N-methylpyrrolidone and non-polar solvents such as benzene, toluene and chloroform. Among them, polar solvents in which the obtained polymer is also soluble and in which the polymerization reaction proceeds smoothly are preferred.

The term "carbon dichalcogenide monomer" herein means one or more member of the group consisting of carbon disulfide, carbon diselenide and carbon ditelluride. Among them, carbon disulfide and carbon diselenide are particularly preferred.

The polymerization temperature is desirably as low as possible, since the boiling points of carbon disulfide and carbon diselenide are as low as 46° C. and 126° C., respectively. Preferred polymerization temperature is in the range of −100 to 50° C. The polymerization by the process of the present invention is possible also at a temperature above the boiling point of carbon disulfide (46° C.) or carbon diselenide (126° C.). In this case, the polymerization must be carried out under an elevated pressure so as to prevent the evaporation of carbon disulfide or carbon diselenide from the solvent. However, the elevated pressure is not as high as thousands to tens of thousands of atmospheres like the conventional processes and the polymerization can be carried out under an elevated pressure of up to 10 atm in the presence of the catalyst according to the present invention. When the elevated pressure is employed, the temperature is controlled up to 200° C.

When the polymerization is carried out at a low temperature, a solvent having a melting point lower than the polymerization temperature must be used as a matter of course. Suitable polymerization temperatures for carbon disulfide and carbon diselenide are −100° C. or higher and −30° C. for higher, respectively, since their melting points are −112° C. and −46° C., respectively. For example, when tetrahydrofuran having a low melting point is used as the solvent, carbon disulfide can be polymerized near −80° C. to −40° C.

The catalysts used in the present invention are anionic polymerization catalysts such as, preferably, alkali metals, alkaline earth metals, alkali metal alkoxides, alkylalkali metals and alkylalkaline earth metals. Among them, alkali metals such as sodium, lithium and potassium are preferred. These alkali metal catalysts may be incorporated in the solvent directly or after converting the same into a dispersion in a paraffin, a complex with naphthalene or the like or an inclusion compound with a crown ether. These catalysts may be mixed previously with the solvent in a given amount or added dropwise to the reaction mixture in the course of the polymerization reaction. The concentration of the catalyst in the solvent is usually in the range of 0.001 to 3.0 mol/l, preferably 0.05 to 1.0 mol/l.

Though the concentration of the carbon dichalcogenide monomer is not particularly limited, it is usually in the range of 0.1 to 1 mol/l.

Though the reaction time is also not particularly limited and varies depending on the solvent, catalyst and reaction temperature, it is preferably 3 h or longer so as to satisfy the object of the present invention and to obtain a high yield. To obtain a high yield, it is necessary to carry out the reaction at a low temperature for a long time.

It is preferred to stir the reaction mixture as violently as possible in the course of the reaction. Particularly when powdery metallic sodium or lithium is used as the catalyst, violent stirring is important for obtaining a homogeneous dispersion.

Thus, a black, powdery polymer can be obtained. This polymer itself has a conductivity of $10^{-8}$ to $10^{-10}$ S/cm that is far higher than that of the polymers produced by the conventional process ($10^{-14}$ S/cm). The conductivity of the polymer can be further improved by doping the same with an electron-donating or electron-accepting substance. The doping can be effected by exposing the polymer in a dopant gas atmosphere, by immersing the polymer in a dopant solution, by an electrochemical doping, by ion implantation or by introducing a dopant into a polymer solution followed by molding of the polymer.

Since the polymer synthesized by the process of the present invention has a characteristic that it is soluble in a polar solvent, a process wherein a dopant is mixed in a solution of the polymer can be employed. Known conductive polymers such as polyacetylene, polypyrrole, polythiophene and poly-p-phenylene cannot be doped by this process, since they are infusible and insoluble in solvents. As compared with other doping processes, the process wherein the dopant is mixed in the polymer solution has advantages that the doping time can be shortened and homogeneous doping is possible. As a matter of course, the carbon dichalcogenide can be doped by any of the above-mentioned doping processes.

The polymers obtained by a conventional carbon disulfide process are insulators having a conductivity of $10^{-14}$ S/cm, which is increased to $10^{-10}$ S/cm by doping with iodine. On the contrary, the polymer obtained by the process of the present invention has a relatively high conductivity of $10^{-8}$ S/cm, which can be further increased to $10^{-3}$ to $10^{-4}$ S/cm by exposing the polymer to iodine atmosphere.

The conductive high molecular materials obtained by the process of the present invention can be used as useful industrial materials for the production of electromagnetic masking shields, heat generators, resisting elements, electric wires and electrode plates, since they are lighter in weight than ordinary metal conductors and they have a high processability.

The present invention relates to the production of conductive polymers from carbon dichalcogenides. When inexpensive carbon disulfide is used as the starting material, conductive materials can be obtained at quite a low cost.

According to the process of the present invention, the polymer can be produced at a temperature of up to room temperature under a pressure of up to 1 atm and, therefore, the workability can be improved remarkably, while severe conditions such as a temperature of as high as around 200° C. and a pressure of several to tens of kilobars are required in the conventional processes.

Another advantage is that the carbon disulfide polymer produced by the process of the present invention has a high conductivity of $10^{-8}$ S/cm, which can be further increased to $10^{-3}$ to $10^{-4}$ S/cm by doping with iodine, while the polymers produced by the conventional processes are insulators having a conductivity of $10^{-4}$ S/cm.

EXAMPLES

Example 1

20 ml of carbon disulfide (monomer) and 40 ml of tetrahydrofuran (solvent), both dehydrated with molecular sieve 5A, were placed in a 200 cc four-necked flask (reactor) under purging with nitrogen gas and the mixture was cooled to −78° C. under stirring with a stirrer in a methanol/dry ice bath. Then, a catalyst solution prepared by dissolving 1.0 g of Na naphthalene in 40 ml of dehydrated tetrahydrofuran under purging with $N_2$ was added dropwise thereto at a rate of about 0.2 ml/min through a dropping funnel to carry out the polymerization for 6 h. A reddish brown reaction mixture containing a precipitate was obtained. 100 ml of water was added slowly to the mixture and its pH was adjusted to 3 with a 10 % aqueous hydrochloric acid solution to divide the same into a viscous dark brown layer (lower layer) and a yellow layer (upper layer). The lower viscous layer was separated by means of a separating funnel and washed with water repeatedly until washings became substantially neutral. The washed polymer was dried at room temperature in vacuum for 6 h to obtain 2.1 g of a reddish brown powder. This product was difficultly soluble in water, alcohol, acetone and toluene and soluble in DMSO, DMF and NMP. The results of infrared analysis were as shown below.

In the IR spectrum obtained by the KBr tablet process, a C=S stretching vibration indicating the presence of a carbon-to-sulfur double bond was observed at 1060 cm$^{-1}$ and an absorption due to a carbon-to-sulfur single bond was observed at 860 and 810 cm$^{-1}$. According to an elementary analysis, the carbon content was 16.1% and the sulfur content was 83.3% which were very close to the calculated values (carbon content of 15.79% and sulfur content of 84.22 %). It was thus confirmed that the product was a carbon disulfide polymer.

The conductivity of the polymer (in the form of pellets obtained by compression molding of the powder) determined at room temperature was $10^{-8}$ S/cm, which was increased to $10^{-3}$ S/cm by contacting with iodine vapor.

Example 2

Carbon disulfide was polymerized for 6 h at room temperature in the same manner as in Example 1 except that tetrahydrofuran used as the solvent was replaced with 40 ml of dimethyl sulfoxide and Na naphthalene used as the catalyst was replaced with a catalyst dispersion of 1.0 g of fine metallic Na powder in 40 ml of benzene (Na dispersion). A reddish brown to dark brown reaction mixture was obtained. After washing and drying effected in the same manner as in Example 1, 6.3 g of a reddish brown to dark brown powder was obtained. The powder was difficultly soluble in water, alcohol, acetone and toluene and soluble in DMSO, DMF and NMP like in Example 1. The results of the IR spectroscopy obtained by the KBr tablet process were the same as in Example 1. According to the results of the elementary analysis, the atomic ratio of carbon to sulfur was 1.0/2.12 which was very close to the calculated ratio of 1/2. Thus, it was supposed that substantially the same polymer as in Example 1 was formed.

The conductivity of the polymer before the doping was $10^{-9}$ S/cm, which was increased to $10^{-3}$ S/cm after doping with iodine.

Example 3

20 ml of carbon disulfide, 40 ml of toluene and 10 ml of a 15 wt. % solution of butyllithium in hexane as the catalyst were placed in the same reactor as in Example 1 under purging with $N_2$ and the reaction was carried out under stirring at room temperature for 5 h to obtain a reddish brown to dark brown reaction mixture. 50 ml of a 10 wt. % aqueous hydrochloric acid solution was added to the reaction mixture, the catalyst was washed repeatedly several times under stirring in one hour and then with water until washings became substantially neutral. After completion of the washing, the solution of the polymer in toluene was distilled under reduced pressure at room temperature to obtain 1.1 g of a dark brown viscous polymer.

In the IR spectrum obtained by the KBr process, a C=S stretching vibration indicating the presence of a carbon-to-sulfur double bond was observed at 1060 $cm^{-1}$.

Example 4

10 ml of carbon disulfide, 30 ml of benzene and 0.5 g of fine sodium powder as catalyst were placed in a 100 ml glass autoclave (resistant to a pressure of 10 $kg/cm^2$) provided with a stirrer. After purging with $N_2$, the autoclave was hermetically closed and the reaction was carried out under stirring at 100° C. under 2.3 $kg/cm^2$ for 6 h. A reaction mixture containing a dark brown precipitate was obtained. After completion of the reaction, the temperature was lowered to room temperature and the catalyst was washed. The formed polymer was concentrated in the same manner as in Example 3 to obtain 1.3 g of a dark brown powder.

The results of the infrared absorption spectroscopy, elementary analysis and conductivity measurement of the polymer were substantially the same as those obtained in Example 1. It was thus proved that the carbon disulfide polymer can be obtained at such a high temperature under elevated pressure.

Example 5

A catalyst solution of 1.5 g of sodium methylate in 10 ml of 15-crown-5-ether was added dropwise to 20 ml of carbon disulfide and 40 ml of dimethyl sulfoxide to carry out the polymerization reaction at room temperature for 6 h in the same manner as in Example 1. After completion of the reaction followed by washing and drying effected in the same manner as in Example 1, 5.4 g of a reddish brown to dark brown powder was obtained.

The obtained, reddish brown to dark brown compound had an absorption at 1060 $cm^{-1}$ in the infrared absorption spectrum supposedly due to a stretching vibration of C=S. The conductivity of the polymer was $10^{-8}$ S/cm, which was increased to $10^{-3}$ S/cm by doping with iodine.

Example 6

2.0 ml of carbon diselenide (monomer, $CSe_2$) and 10 ml of N-methyl-2-pyrrolidone (solvent), both dehydrated with molecular sieve 5A, were placed in a 50 cc three-necked flask (reactor) under purging with nitrogen gas. A catalyst solution of 0.25 g of Na naphthalene in 10 ml of dehydrated N-methyl-2-pyrrolidone was added dropwise thereto at a rate of about 0.2 ml/min through a dropping funnel under stirring at room temperature (20° C.) in 15 h to carry out the polymerization. A reddish brown reaction mixture containing a precipitate was obtained. 30 ml of water was added slowly to the mixture and the pH was adjusted to 3 with a 10 % aqueous hydrochloric acid solution to form a dark brown precipitate. The precipitate was separated by filtration and washed with water repeatedly until washings became neutral. The washed polymer was dried in vacuum at room temperature for 6 h to obtain 5.0 g of a dark brown powder. This product was difficultly soluble in water, alcohol, acetone and toluene and largely soluble in DMSO, DMF and NMP. The results of infrared spectroscopy were as shown below. In the IR spectrum obtained by the KBr tablet process, a C=Se stretching vibration indicating the presence of a carbon-to-selenium double bond was observed at 880 $cm^{-1}$ and no vibration of the remaining monomer at 1260 $cm^{-1}$ was observed.

The conductivity of the polymer (in the form of pellets obtained by compression molding of the powder) determined at room temperature was $10^{-8}$ S/cm, which was increased to $10^{-3}$ S/cm by contacting the same with iodine vapor in vacuum.

Example 7

Carbon diselenide was polymerized at room temperature for 15 h in the same manner as in Example 6 except that N-methyl-2-pyrrolidone was replaced with 10 ml of dimethyl sulfoxide and Na naphthalene used as the catalyst was replaced with a catalyst dispersion of 0.25 g of fine metallic Na powder in 10 ml of benzene (Na dispersion). A reddish brown to dark brown reaction mixture was obtained. After washing and drying effected in the same manner as in Example 6, 4.8 g of a dark brown powder was obtained. The powder was difficultly soluble in water, alcohol, acetone and toluene and largely soluble in DMSO, DMF and NMP as in Example 6. The results of the IR spectroscopy by the KBr process were substantially the same as in Example 6. It was assumed that the obtained polymer was substantially the same as in Example 6.

The conductivity of the polymer before doping was $10^{-9}$ S/cm, which was increased to $10^{-3}$ S/cm by doping with iodine.

Example 8

2 ml (5.3 g) of carbon diselenide, 20 ml of toluene and 3 ml of a 15 wt. % solution of butyllithium in hexane were placed in the same reactor as in Example 6 under purging with $N_2$. The reaction was carried out under stirring at room temperature for 15 h to obtain a reddish brown to dark brown reaction mixture. 30 ml of a 10 wt. % aqueous hydrochloric acid solution was added to the reaction mixture and the catalyst was washed repeatedly several times under stirring for 1 h and then with water until washings became substantially neutral. After completion of the washing, the solution of the polymer in toluene was distilled under reduced pressure at room temperature to obtain 0.5 g of a dark brown, viscous polymer.

In the IR spectrum obtained by the KBr process, a C=Se stretching vibration indicating the presence of a carbon-to-selenium double bond was observed at 880 $cm^{-1}$.

Example 9

2 ml (5.3 g) of carbon diselenide, 30 ml of benzene and 0.2 g of fine sodium powder were placed in a 100 ml glass autoclave (resistant to a pressure of 10 $kg/cm^2$) provided with a stirrer. After purging with $N_2$, the autoclave was closed and the reaction was carried out by stirring at 100° C. under 1.8 $kg/cm^2$ for 8 h. A reaction mixture containing a dark brown precipitate was obtained. After completion of the reaction, the temperature was lowered to room temperature and the catalyst was washed. The formed polymer was concentrated in the same manner as in Example 8 to obtain 3.2 g of a dark brown powder.

The infrared spectrum and the conductivity of the polymer determined in the same manner as in Example 6 were substantially the same as in Example 6. Thus, the carbon diselenide polymer can be obtained at a high temperature under high pressure.

Example 10

A catalyst solution of 0.3 g of sodium methylate in 2 ml of 15-crown-5-ether was added dropwise to the solution comprising of 1 ml (2.6 g) of carbon diselenide and 40 ml of dimethyl sulfoxide as the solvent. Polymerization was carried out at room temperature for 15 h in the same manner as in Example 6. After completion of the reaction followed by the washing and drying carried out in the same manner as in Example 6, 0.5 g of a reddish brown to dark brown powder was obtained.

The obtained reddish brown to dark brown compound has an absorption supposedly due to a stretching vibration of C=Se at 880 $cm^{-1}$. The conductivity of the polymer was $10^{-8}$ S/cm, which was increased to $10^{-3}$ S/cm after doping with iodine.

What is claimed is:

1. A process for preparing a carbon disulfide homopolymer or carbon diselenide homopolymer, which comprises homopolymerizing carbon disulfide monomer or carbon diselenide monomer, dissolved in a solvent, in the presence of an anionic polymerization catalyst.

2. A process according to claim 1, wherein the homopolymerization is carried out at a pressure of up to 10 atmospheres.

3. A process according to claim 1, wherein the homopolymerization is carried out at a temperature in the range of $-100°$ to 50° C.

4. A process according to claim 1, wherein the polymerization is carried out at a temperature of up to 200° C. under an elevated pressure of up to 10 atm.

5. A process according to claim 1, wherein the solvent is a polar solvent.

6. A process according to claim 5, wherein the homopolymer is soluble in the solvent.

7. A process according to claim 1, wherein the solvent is a non-polar solvent.

8. A process according to claim 1, wherein the anionic catalyst is at least one compound selected from the group consisting of alkali metals, alkaline earth metals, alkali metal alkoxides, alkylalkali metals and alkylalkaline earth metals.

9. A process acording to claim 8, wherein the anionic polymerization catalyst is sodium, lithium or potassium.

10. A process according to claim 1, wherein the concentration of the anionic polymerization catalyst in the solvent is in the range of 0.001 to 3.0 mol/l.

11. A process according to claim 1, wherein the reaction is carried out under stirring.

12. A process according to claim 1, wherein the homopolymer has a conductivity of about $10^{-8}$ mho/cm.

13. A carbon disulfide or carbon diselenide homopolymer obtained by the anionic polymerization of carbon disulfide or carbon diselenide monomer in an organic solvent.

* * * * *